United States Patent
Pettit (10) Patent No.: US 6,925,136 B1
(45) Date of Patent: Aug. 2, 2005

(54) SIMULTANEOUS FREQUENCY AND PHASE SYNCHRONIZER

(75) Inventor: Ray H. Pettit, Northridge, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 857 days.

(21) Appl. No.: 09/942,397

(22) Filed: Aug. 29, 2001

(51) Int. Cl.[7] .............................................. H04L 7/04
(52) U.S. Cl. ..................... 375/362; 332/100; 375/136; 375/274; 375/279
(58) Field of Search ................................ 375/362, 327, 375/376, 373

(56) References Cited

U.S. PATENT DOCUMENTS

| | | | | | |
|---|---|---|---|---|---|
| 5,245,611 A | * | 9/1993 | Ling et al. | ................... | 370/347 |
| 5,260,671 A | * | 11/1993 | Iso et al. | ..................... | 329/302 |
| 5,260,975 A | * | 11/1993 | Saito | ........................... | 375/327 |
| 5,473,637 A | * | 12/1995 | Gardner | ...................... | 375/329 |
| 5,535,249 A | * | 7/1996 | Miyashita | ................... | 375/344 |
| 5,960,040 A | * | 9/1999 | Cai et al. | ..................... | 375/279 |
| 6,466,630 B1 | * | 10/2002 | Jensen | ......................... | 375/327 |
| 6,590,941 B2 | * | 7/2003 | Legrand et al. | ............. | 375/316 |
| 2004/0205416 A1 | * | 10/2004 | Shirota | ........................ | 714/48 |

OTHER PUBLICATIONS

Blind self–noise–free frequency detectors for a subclass of MSK–type signals, Spasojevic, P.; Georghiades, C.N.; Communications, IEEE Transactions on , vol.: 48 , Issue: 4 Apr. 2000; pp.: 704–715.*

MSK–Type Reception of Continuous Phase Modulation: Cochannel and Adjacent Channel Interference Rhodes, R. Wilson, S. Svensson, A.; Pub Date: Feb. 1987; vol.: 35 , Issue: 2 Communications, IEEE Transactions.*

A fully digital noncoherent and coherent GMSK receiver architecture with joint symbol timing error and frequency offset estimation Yung–Liang Huang Kang–Dar Fan Chia–Chi Huang; Pub Date: May 2000 vol.: 49 , Issue: 3; IEEE Vehicular Technology.*

U.S. Appl. No. 09/785,624, filed Feb 16, 2001, Pettit.

* cited by examiner

Primary Examiner—Stephen Chin
Assistant Examiner—Harry Vartanian
(74) Attorney, Agent, or Firm—Stephen T. Hunnius; Michael A. Kagan; Peter A. Lipovsky (57) ABSTRACT

A frequency and phase synchronizer system comprises a processor for executing a sequence of operations, which include: a) initializing a frequency error estimate value and phase error estimate value; b) separating discrete samples of a continuous phase modulation signal into a first sequence of odd numbered samples of the signal, and a second sequence of even numbered samples of the signal; c) determining an unknown frequency offset value from the first and second sequences, frequency error estimate, and phase error estimate; d) determining an unknown phase offset value from the first and second sequences, frequency error estimate, phase error estimate, and a first discrete data sample of said discrete samples of the continuous phase modulation signal; f) updating the frequency error estimate from the unknown frequency offset value; and updating the phase error estimate from the unknown phase offset value.

17 Claims, 6 Drawing Sheets

SIMULTANEOUS FREQUENCY AND PHASE SYNCHRONIZER

BACKGROUND OF THE INVENTION

The present invention generally relates to simultaneous frequency and phase synchronizers for digital communications systems, and more particularly, to a frequency and phase synchronizer that achieves both frequency and phase acquisition, and frequency and phase tracking without requiring knowledge at the receiver of baud timing, or without the necessity of a preamble consisting of known signal symbols.

All digital communications systems operate on the basis of a finite number of possible waveforms available for transmission during any particular signaling interval. The digital receivers of such digital communications systems must process versions of these transmitted waveforms which generally are corrupted by noise, channel fading, multipath, distortion, unintentional interference, and jamming, for example. The receiver's task is to determine which was the transmitted waveform for a particular signaling interval. Acceptable performance requires that this determination be achieved with high probability of correctness.

The degree of success potentially achievable by a digital communications system depends on the accuracy of reference signals at the receiver in their representation of the possible transmitted waveforms, as they would appear at the receiver, including the effects of noise, etc. To a large degree, achieving good reference signals is synonymous with having the receiver be synchronized with the transmitted waveforms arriving over a transmission channel.

Synchronization in a particular case may involve several parameters. For example, the receiver's reference signals should be based on the correct carrier frequency, which may be unknown due to oscillator drifts or doppler shifts. For best performance, the receiver should have a timing reference to know the beginning of each signaling waveform. For Time-Division-Multiplex (TDM) and/or Time-Division-Multiple Access (TDMA) systems, the level of timing information must be extended to knowing the beginning of groups of time slots (frame synchronization). In order to have the performance improvement potentially available from coherent detection, the receiver requires accurate knowledge of the carrier's phase angle (phase synchronization). For spread-spectrum systems, synchronization to a hopping-frequency pattern and/or a spread-spectrum code sequence is required. For all levels of synchronization, typically the receiver's synchronizers are required to provide good estimates of the unknowns (frequency, phase, timing, etc.) during an initial start-up period (so-called "acquisition") and to continue to provide good estimates as the system proceeds to operate (so-called "tracking").

Two general approaches have been useful for designing synchronizers for digital receivers. Many existing synchronizers are based on good engineering reasoning as to what can work (so-called "ad hoc" procedures), as opposed to being mathematically derived based on various math models and theoretical reasoning. Synchronizers of the latter type typically are derived, and implemented, by using the tools of Estimation Theory based upon the Maximum-Likelihood criterion of goodness (maximization of appropriate conditional probability density functions).

The choice and/or design of synchronizers for a particular system greatly depends on the digital modulation technique to be employed and the channel over which the communication is to take place. Practical solutions have long existed for conventional digital modulation techniques such as Phase Shift Key (PSK), Frequency Shift Key (FSK), Amplitude Shift Key (ASK), and Quadrature Amplitude Modulation (QAM), particularly for the case of a Gaussian noise channel. To meet requirements of transmitting data at high rates, with high accuracy, and with minimal bandwidth usage, newer digital signaling techniques have been found. These include Trellis-Coded Modulation (TCM) and Continuous-Phase Modulation (CPM). Generally, the synchronizers for the older, conventional digital receivers are inadequate for the newer techniques. In fact, there are many theoretical versions (special cases) of the energy-efficient and bandwidth-efficient CPM which would be preferred choices for applications but for the lack of good, achievable synchronizers. Since general solutions are unknown, each category of CPM requires finding specialized solutions for the synchronizer designs required for system operation.

An existing system for which better synchronizers are desirable is a special version of CPM known as dual-h, 4-ary, full-response. CPM has been selected as the 5-kHz and 25-kHz UHF SATCOM standard in MIL-STD-188-181B. The meaning of these terms follows from the mathematical model of a signal having the specified CPM waveform, s(t), given below.

$$s(t) = \sqrt{\frac{2E_s}{T}} \, e^{j\Psi(t,\alpha)}$$

with $E_s$ representing the waveform's energy over its interval T, and $\Psi(t,\alpha)$ is the phase function. The function $\Psi(t, \alpha)$ depends on the data sequence $\alpha=(---\alpha_{i-1}, \alpha_i, \alpha_{i+1}, ---)$ where each of the data symbols is randomly and independently selected from the four possibilities ($\pm 1$, $\pm 3$), hence "4-ary." Also, $\Psi(t, \alpha)$ depends on two constants $h_0$ and $h_1$, called "modulation indexes," and a function q(t), called the "phase response function," as follows.

$$\Psi(t, \alpha) = 2\pi h_0 \sum_i \alpha_{2i} q(t - 2iT) + 2\pi h_1 \sum_i \alpha_{2i+1} q(t - 2iT - T)$$

Values for the modulation indices $h_0$ and $h_1$ are selected in advance for a particular synchronizer design and are therefore, fixed numbers for input to a synchronizing circuit. For example, synchronizers built in accordance with MIL-STD-188-181B include modulation indices defined, for example, wherein $$h_0 = \frac{1}{4} \text{ and } h_1 = \frac{5}{16}.$$

One method for synchronizing for the above CPM waveform requires transmitting a preamble at the beginning of a message. The preamble is a sequence of non-data symbols, known to the receiver. This preamble sequence is transmitted by means of a modulation technique, less complex than the CPM used for data, called Minimum Shift Key (MSK). However, this method of synchronization has certain undesirable characteristics. For example, the requirement that a start-up interval be set aside for a known preamble means a reduction in information rate. A serious problem arises if the receiver is unable to detect the preamble, thus leading to the loss of the follow-on message. Another potential problem of great concern when operating in the presence of an adversary is that the use of a different modulation for a preamble from that for data offers the adversary significant information useful for a jamming attack.

Therefore, a need exists for synchronization processors/circuits that operate without a preamble and without changing modulation methods within a transmission.

SUMMARY OF THE INVENTION

The present invention provides a frequency and phase ("F/P") synchronizer for synchronizing a CPM signal that does not require a transmitted known-sequence preamble prior to the transmission of information symbols as a message. Nor does the synchronizer require that the receiver be synchronized in time prior to its operation to obtain information allowing the receiver to become synchronized in frequency and phase, a process referenced as frequency and phase acquisition. In addition to frequency and phase acquisition, the F/P synchronizer provides the receiver with continual updates on reference-frequency and phase changes during the time of message transmission, so-called frequency and phase tracking.

The F/P synchronizer is based on the maximum likelihood criterion from estimation theory. The F/P synchronizer can achieve both frequency and phase acquisition, and frequency and phase tracking without requiring knowledge at the receiver of the baud timing. Moreover, the F/P synchronizer does not require a preamble consisting of known signal symbols.

A F/P synchronizer comprises a processor for executing a sequence of operations, which include: a) initializing a frequency error estimate value and phase error estimate value; b) separating discrete samples of a continuous phase modulation signal into a first sequence of odd numbered samples of the signal, and a second sequence of even numbered samples of the signal; c) determining an unknown frequency offset value from the first and second sequences, frequency error estimate, and phase error estimate; d) determining an unknown phase offset value from the first and second sequences, frequency error estimate, phase error estimate, and a first discrete data sample of said discrete samples of the continuous phase modulation signal; f) updating the frequency error estimate from the unknown frequency offset value; and updating the phase error estimate from the unknown phase offset value.

The F/P synchronizer is applicable for use in conjunction with receivers that detect communications signals that belong to a class of digital modulation waveforms known as dual-h, 4-ary, full-response, CPM. Since the F/P synchronizer of the invention operates without a transmitted preamble, the energy efficiency and the bandwidth efficiency of the communications system are greater than for systems that require preambles. Inherent properties of CPM provide even more energy efficiency and bandwidth efficiency. An important advantage of the invention is that it obviates the need for different modulation methods for signals that employ preambles.

Other advantages of the invention will become apparent upon review of the following specification, including the claims, and the accompanying figures.

BRIEF DESCRIPTION OF THE DRAWINGS

Throughout the several views, like elements are referenced using like references.

DESCRIPTION OF THE PREFERRED EMBODIMENT

Figure 1:
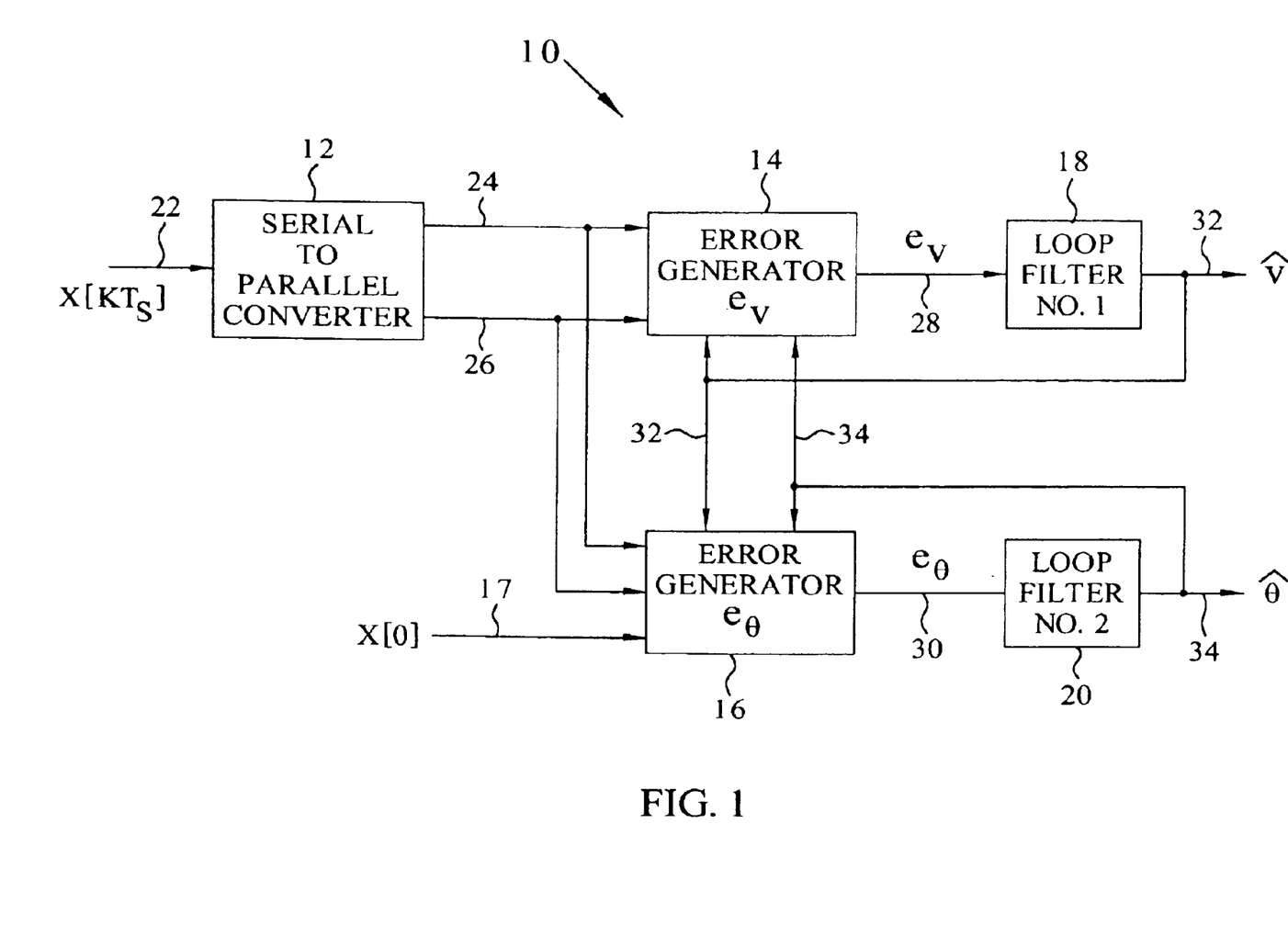
FIG. 1 is a block diagram representing a frequency and phase (F/P) synchronizer that embodies various features of the present invention.

The present invention is directed to a frequency and phase ("F/P") synchronizer for synchronizing a Continuous-Phase Modulation (CPM) signal that does not require timing information from a detected signal prior to processing for frequency and phase estimation. Nor does the invention require that there be a preamble of known symbols at the beginning of a transmitted sequence. Referring to FIG. 1, there is shown a block diagram of a method that embodies several features of the present invention for implementing a frequency and phase synthesizer 10 that generates frequency and phase error estimates that are used to synchronize a CPM signal 22. The F/P synchronizer 10 corrects apparently erroneous frequency and phase values of a reference signal that the CPM signal 22 purportedly models. System 10 includes a serial to parallel converter 12, unknown frequency offset error generator 14, unknown phase offset error generator 16, and loop filters 18 and 20. Signal 22 is represented as a series of discrete time samples represented by $x(kT_s)$, where k is an integer index so that $x(kT_s)$ is the $k^{th}$ sample of the set $x(kT_s)$, $T_s$ represents a sampling time interval for signal 22, and x represents the value of the sample. Serial to parallel converter 12 separates signal 22 into a sequence of even numbered discrete samples 24 of signal 22, represented as $x[(2nN+1)T_s]$, and a sequence of odd numbered discrete samples 26 of signal 22, represented as $x[(2nN+N+1)T_s]$, where n represents an integer index, $\alpha_n$ is the $n^{th}$ information symbol of signal 22, N represents the number of samples taken for each information symbol, and l is an integer index that represents each of the N sample signals 66 that are accumulated at step 68 in the unknown frequency offset error generator 14 shown in FIG. 2, and each of the N sample signals 132 that are accumulated at step 134 in the unknown phase offset error generator 16. Signals 24 and 26 each are provided to unknown frequency offset error generator 14 and unknown phase offset error generator 16.

The output signal 28 of unknown frequency offset error generator 14 represents an unknown frequency offset value $e_v$ which is provided to loop filter 18. The loop filter 18 generates a signal 32 that represents a frequency error estimate ($\hat{v}$) and is provided as feedback to each of unknown frequency offset error generator 14 and unknown phase offset error generator 16. The output signal 30 of unknown phase offset error generator 16 is an unknown phase offset value $e_\theta$ which is provided to loop filter 20. Loop filter 20 generates signal 34 from signal 28. Signal 34 represents a phase error estimate $\hat{\theta}$ that is provided as feedback to each of unknown frequency offset error generator 14 and unknown phase offset error generator 16. Signals 32 and 34 are used to minimize or eliminate the frequency and phase errors that characterized signal 22. Signals 32 and 34, frequency error estimate $e_v$ and phase error estimate $e_\theta$, provide the basis for adjusting the reference CPM signal 22 detected at receiver 302, shown in FIG. 6, for better demodulation for recovery of the information symbols $\alpha_n$ of signal 22. At the initialization of the operation of F/P synchronizer 10, signals 32 and 34 each may be provided with an initial value of zero. Also provided to unknown phase offset error generator 16 is signal 17, which represents the first discrete data sample x[0] of signal 22 and serves as a reference value.

Figure 2:
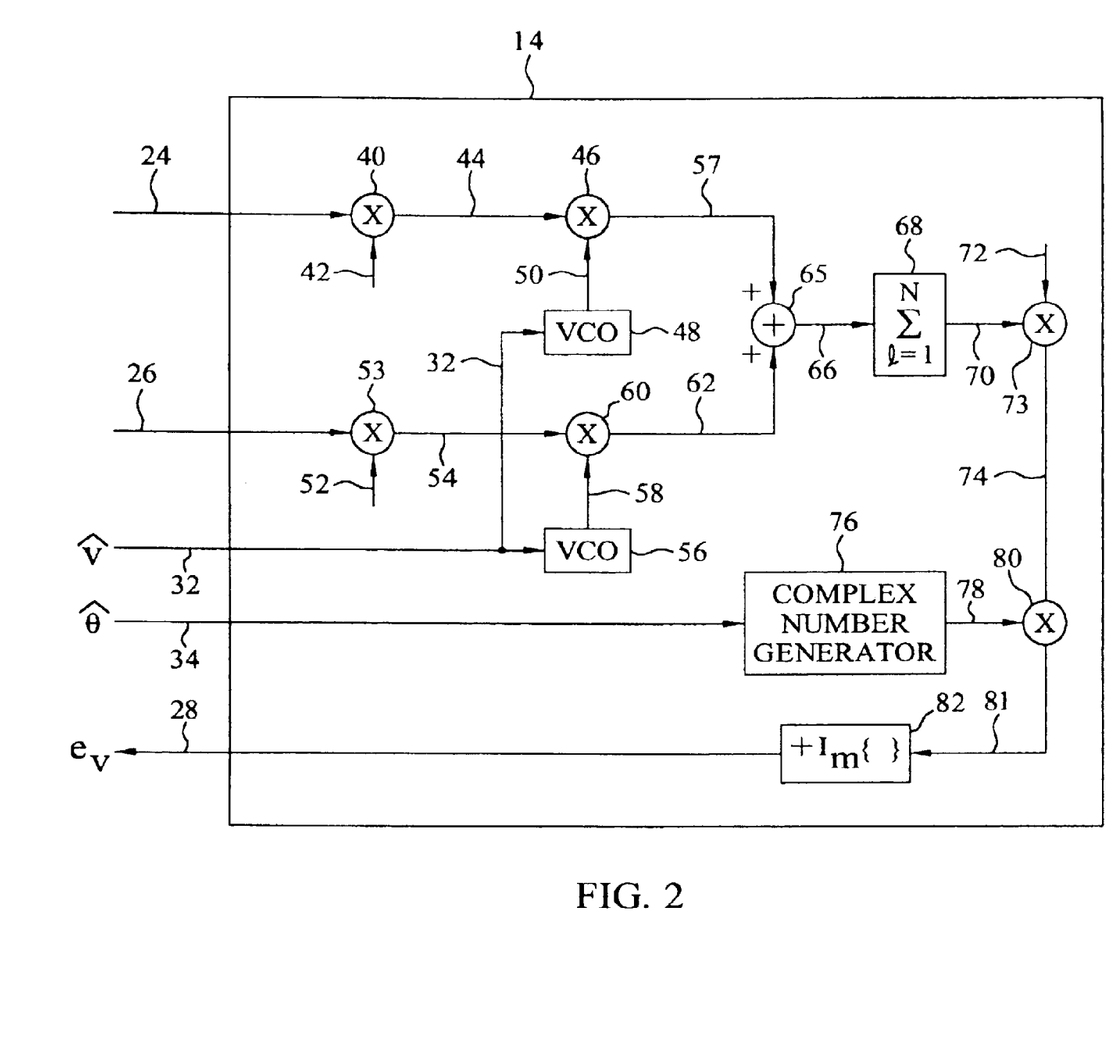
FIG. 2 is a detailed block diagram of the unknown frequency offset error generator shown in FIG. 1.

In FIG. 2 there is shown a more detailed block diagram of unknown frequency offset error generator 14. Signal 24 and parameter signal 42 are multiplied at node 40 to produce product signal 44, where parameter signal 42 represents $(2nN+l) \cdot g_1(h_0, l, N)$, and $$g_1(h_0, l, N) = \frac{l}{N}\cos\pi h_0 \cdot \cos 2\pi h_0 + \left(1 - \frac{l}{N}\right).$$

Signal 32, representing the frequency error estimate $\hat{v}$, is provided to each of discrete time voltage controlled oscillators 48 and 56. The output of discrete time voltage controlled oscillator 48 is a complex exponential signal 50 that represents $e^{-j2\pi(2nN+l)\hat{v}T_s}$. Signals 26 are multiplied by parameter 52 at node 53 to produce product signal 54, where parameter signal 52 represents $(2nN+N+l) \cdot f_1(h_0, h_1, l, N)$ and:

$$f_1(h_0, h_1, l, N) = \frac{l}{N}\cos\pi h_0 \cdot \cos 2\pi h_0 \cdot \cos\pi h_1 \cdot \cos 2\pi h_1 + \left(1 - \frac{l}{N}\right)\cos\pi h_0 \cos 2\pi h_0,$$

and the modulation indices $h_0$ and $h_1$ are defined herein above. Discrete time voltage controlled oscillator 56 generates a complex exponential signal 58 that represents $e^{-j2\pi(2nN+N+l)\hat{v}T_s}$, whereupon at node 60, product signal 54 and complex exponential signal 58 are multiplied together to produce product signal 62. Product signals 44 and 50 are multiplied together at node 46 to produce product signal 57. Product signals 57 and 62 are each a sequence of values that are added at node 65 to produce sum signals 66 which are totaled at node 68 to provide an accumulated sum signal 70 that represents $$\sum_{l=1}^{N} (\text{signal } 57_l + \text{signal } 62_l).$$

Accumulated sum signal 70 and parameter signal 72 are multiplied at node 73 to provide product signal 74, where parameter signal 72 represents $[f_0(h_0, h_1)]^n$, and:

$$f_0(h_0, h_1) = \cos \pi h_0 \cdot \cos 2\pi h_0 \cdot \cos \pi h_1 \cdot \cos 2\pi h_1.$$

Signal 34, representing the phase error estimate $\hat{\theta}$ is provided to a complex number generator 76, such as a look-up table, which then emits a complex exponential signal 78 that represents $e^{-j\hat{\theta}}$. However, it is to be understood that complex number generator 76 may be implemented using other methods, such as a by a sequence of computer generated instructions that execute an algorithm that uses the value represented by signal 34 as an input. Product signal 81, the product of product signal 74 and complex exponential signal 78, is determined at node 80 and has both real and imaginary components. The unknown frequency offset value $e_v$ represented by signal 28 is the imaginary component of signal 81, $I_m\{\text{signal } 80\}$ that is identified at step 82.

Figure 3:
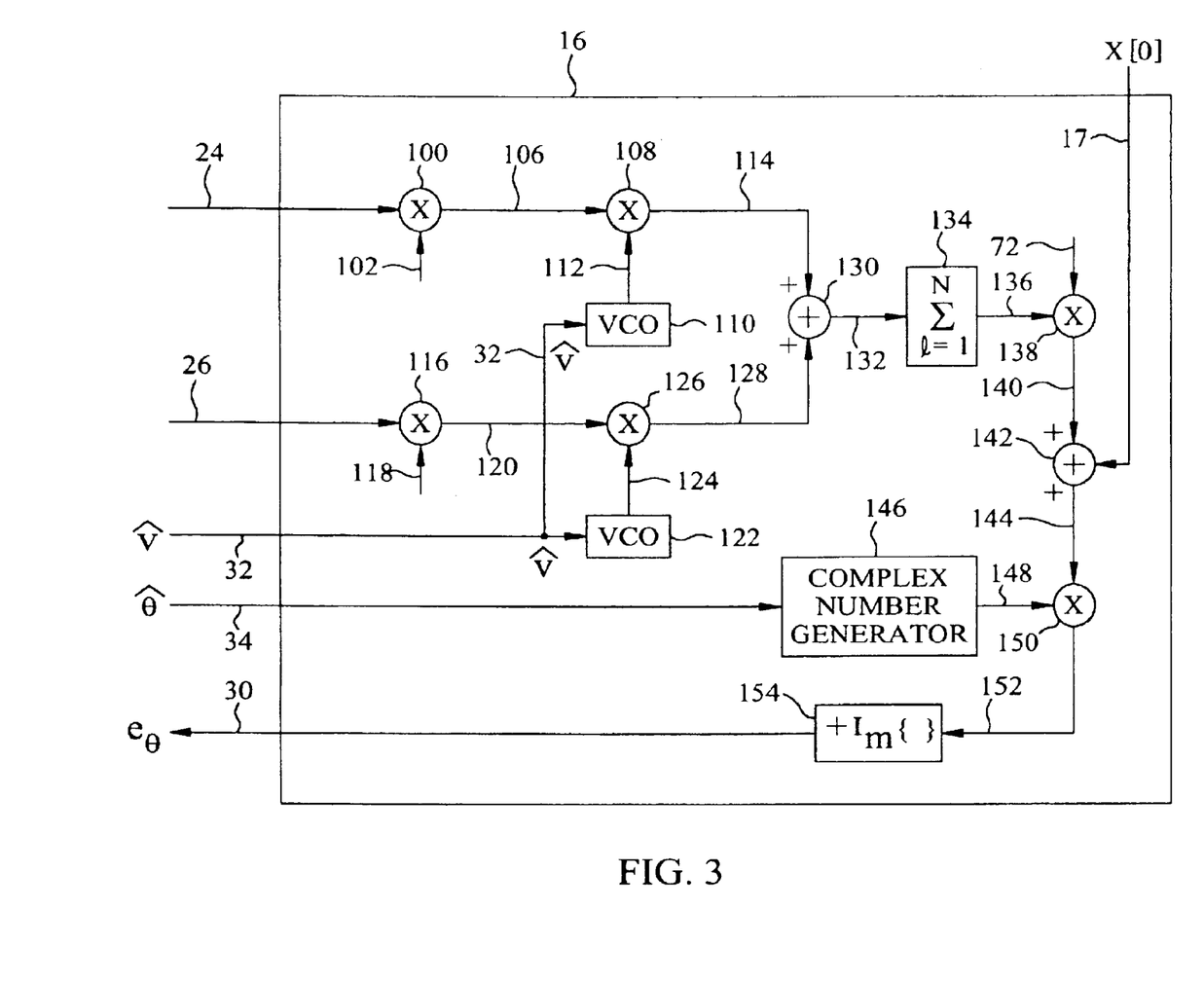
FIG. 3 is a block diagram of the unknown phase offset error generator depicted in FIG. 1.

Referring to FIG. 3, there is shown a detailed block diagram of unknown phase offset error generator 16. Signal 24 $\{x[(2nN+l)T_s]\}$ and parameter signal 42 are multiplied at node 100 to produce product signal 106, where parameter 102 represents $g_1(h_0, l, N)$. Signal 32, representing the frequency error estimate $\hat{v}$, is provided to each of discrete time voltage controlled oscillators 110 and 122. The output of discrete time voltage controlled oscillator 110 is a voltage signal 112 represented as $e^{-j2\pi(2nN+l)\hat{v}T}$. At node 108, signals 106 and 112 are multiplied together to produce signal 114. Signal 26 is multiplied by parameter signal 118 at node 116 to produce signal 120, where signal 118 represents $f_1(h_0, h_1, l, N)$, as defined above. Using signal 32 ($\hat{v}$) as an input, discrete time voltage controlled oscillator 122 generates a voltage signal 124 represented as $e^{-j2\pi(2nN+N+l)\hat{v}T}$. At node 126, signals 120 and 124 are multiplied together to produce signal 128. Signals 114 and 128 are comprised of a sequence of values that are added at node 130 to produce sum signals 132 which are totaled at node 134 to provide a totalized sum signal 136 that represents $$\sum_{l=1}^{N} (\text{signal } 114_l + \text{signal } 128_l).$$

Signal 136 and parameter 72 are multiplied at node 138 to provide product signal 140, where as stated above, parameter signal 72 represents $[f_0(h_0, h_1)]^n$. Product signal 140 and reference signal 17 are added at node 142 to provide sum signal 144. Signal 34, representing the phase error estimate $\hat{\theta}$, is provided to a complex number generator 146, such as a look-up table, which then emits a complex exponential signal 148 that represents $e^{-j\hat{\theta}}$. However, it is to be understood that complex number generator 148 may be implemented using other methods, such as a by a sequence of computer generated instructions that execute an algorithm that uses the value represented by signal 34 as an input. Signal 152, the product of signals 144 and 148, is determined at node 150, and has both real and imaginary components. The imaginary component of signal 152, $I_m\{\text{signal } 80\}$ is identified at step 154 which provides the most recent estimated unknown phase offset value $e_\theta$.

Figure 4:
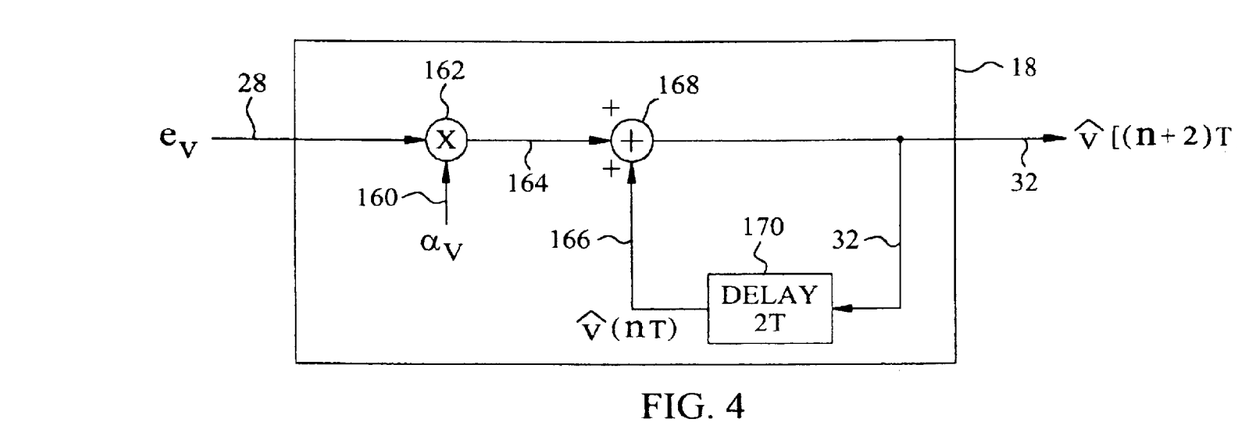
FIG. 4 is a block diagram of one of the loop filters shown in FIG. 1.

Loop filter 18 is shown in detail in FIG. 4. The unknown frequency error offset value $e_v$ and a "step size" parameter $\alpha_v$ represented by signal 160 are multiplied at node 162 to provide a product represented by signal 164. The parameter $\alpha_v$ and a parameter $\alpha_\theta$, referenced in the next paragraph, are typical "step size" parameters characteristic of closed-loop feedback systems. The "step size" parameters are chosen by the system designer on the basis of measurement and/or computer simulation data that the application of the F/P synchronizer 10 on CPM signal 22 converges within a reasonable time towards the correct values of the unknown frequency and phase offset values $\hat{v}$ and $\hat{\theta}$, respectively, without excessive jumps about the correct values. The choices for $\alpha_v$ and $\alpha_\theta$ for a particular system generally represent a compromise for the system designer. Then the summation of the values represented by a weighted frequency error value (signal 164) and frequency offset feedback delay signal 166 are added at summation node 168 to provide an updated frequency offset value $\hat{v}$ that is represented by signal 32. Signal 32 is directed through delay 170 which outputs signal 166 having a time delay of 2T with respect to signal 32, where T represents an information symbol time interval, i.e., the time between information symbols $\alpha_n$ and $\alpha_{n+1}$, and $T=NT_s$. The time delay 2T provides the previous estimate of the frequency offset signal $\hat{v}nT$ (signal 166) for upgrading by the weighted frequency error value (signal 164) at node 168 to provide the present value of $\hat{v}_{(n+2)T}$ (signal 32).

Figure 5:
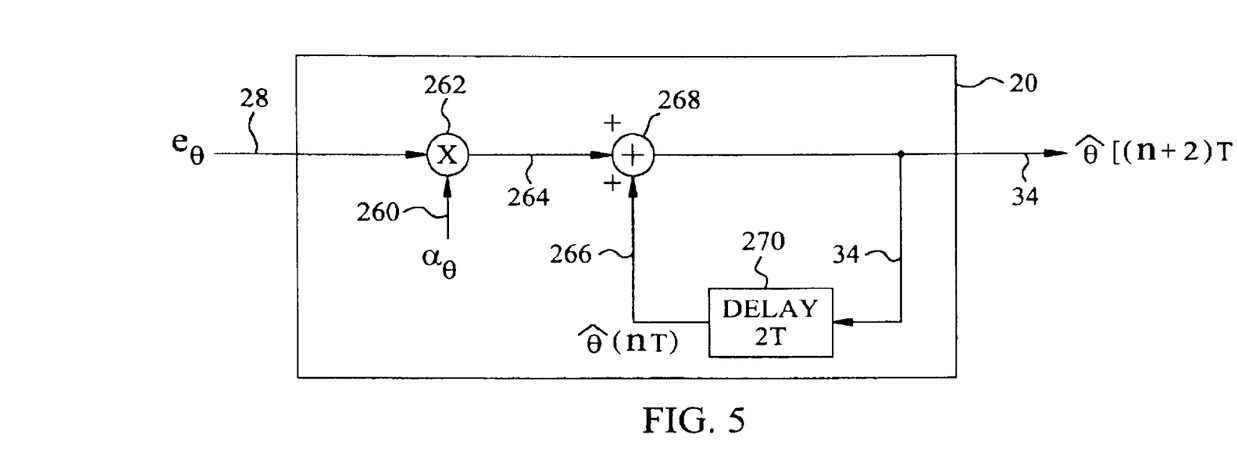
FIG. 5 is a block diagram of a second loop filter shown in FIG. 1.

Loop filter 20 is shown in detail in FIG. 5. The unknown phase error offset value $e_\theta$ and "step size" parameter value $\alpha_\theta$ represented by signal 260 are multiplied at node 262 to provide a product represented by weighted phase error value (signal 264). Then a summation of the values represented by signal 264 and phase offset feedback delay signal 266 are added at node 268 to provide the phase error estimate $\hat{\theta}$ that is represented by signal 34. Signal 34 is directed through delay 270 which outputs signal 266 having a time delay of 2T with respect to signal 34. The time delay 2T provides the previous estimate of the phase offset signal $\hat{\theta}_{nT}$ (signal 266) for upgrading by the weighted phase error value (signal 264) at node 268 to provide the present value of $\hat{\theta}_{(n+2)T}$ (signal 34).

Figure 6:
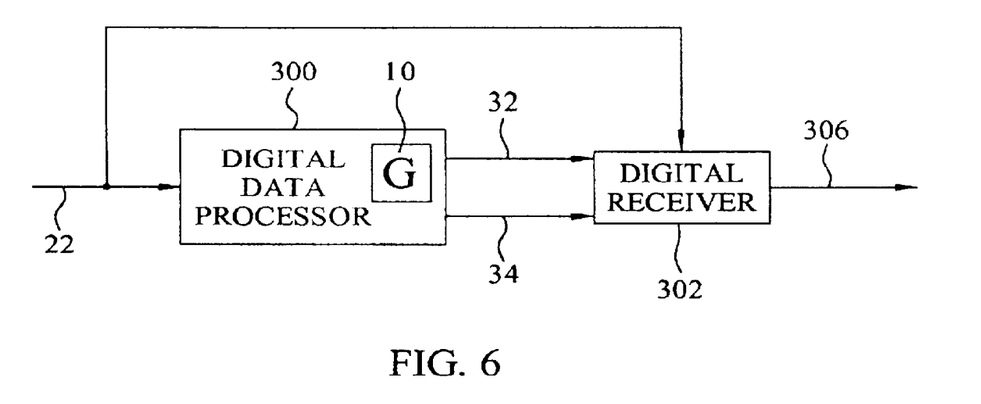
FIG. 6 is a block diagram of a digital data processor for implementing the frequency and phase synchronizer that is coupled to a digital receiver.

As shown in FIG. 6, F/P synchronizer 10 may be implemented as a sequence of executable operations in a discrete time digital data processor 300 which provides signals 32 ($\hat{v}$) and 34 ($\hat{\theta}$) to a digital receiver 302, which also receives signal 22. In turn, digital receiver 302 generates a frequency and phase corrected output signal 306 which is an estimate of an original data sequence (not shown) that is represented by signal 22. The operation of F/P synchronizer 10 may be repeated any integral number of times to provide increasingly refined values for the corrected frequency offset value $\hat{v}$ and corrected phase offset value $\hat{\theta}$.

Figure 7:
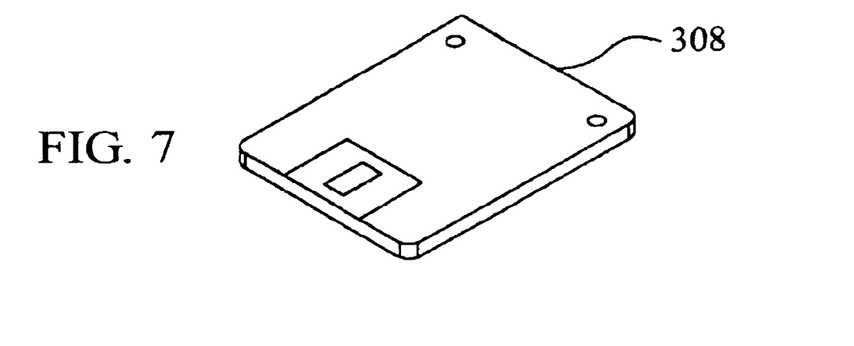
FIG. 7 shows a diskette having a computer readable program code embedded therein for causing a computer to execute the sequence of operations shown in the block diagram of FIG. 1.
Figure 8:
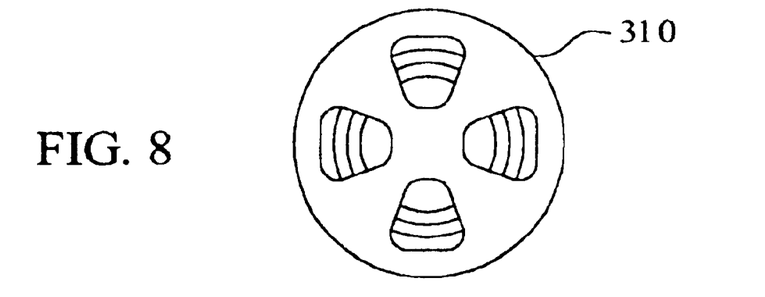
FIG. 8 shows a magnetic tape having a computer readable program code embedded therein for causing a computer to execute the sequence of operations shown in the block diagram of FIG. 1.
Figure 9:
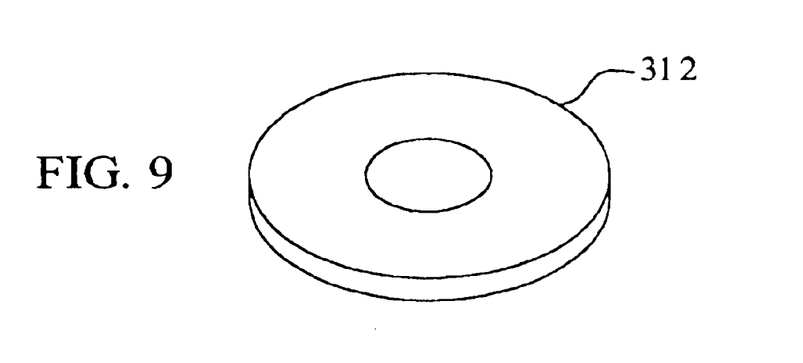
FIG. 9 shows an optical disk having a computer readable program code embedded therein for causing a computer to execute the sequence of operations shown in the block diagram of FIG. 1.
Figure 10:
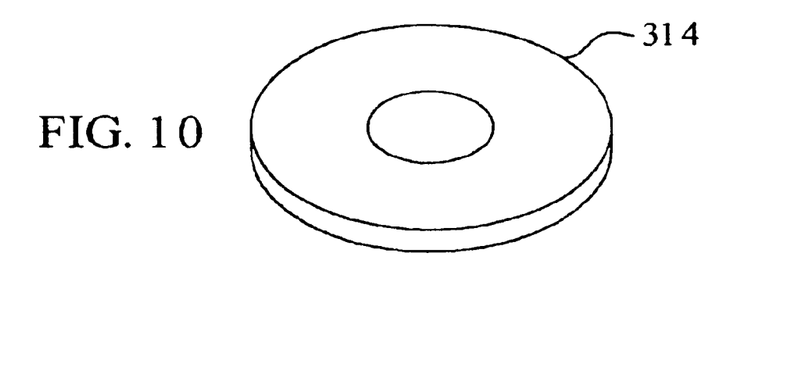
FIG. 10 shows a CD-ROM having a computer readable program code embedded therein for causing a computer to execute the sequence of operations shown in the block diagram of FIG. 1.

In another embodiment the invention may be implemented as a computer program product that includes a computer usable medium having a computer readable program code embedded therein for causing a computer such as digital data processor 300 to execute the sequence of operations described above. Examples of computer usable media include a diskette 308 (FIG. 7), magnetic tape 310 (FIG. 8), optical disk 312 (FIG. 9), and CD-ROM 314 (FIG. 10).

Obviously, many modifications and variations of the present invention are possible in light of the above teachings. It is therefore to be understood that within the scope of the appended claims, the invention may be practiced otherwise than as specifically described.

I claim:

1. A frequency and phase synchronizer system, comprising:
    a processor for executing a sequence of operations, which include:
        a) initializing a frequency error estimate value and phase error estimate value;
        b) separating discrete samples of a continuous phase modulation signal into a first sequence of odd numbered samples of said signal, and a second sequence of even numbered samples of said signal;
        c) determining an unknown frequency offset value from said first and second sequences, frequency error estimate, and phase error estimate;
        d) determining an unknown phase offset value from said first and second sequences, frequency error estimate, phase error estimate, and a first discrete data sample of said discrete samples of said continuous phase modulation signal;
        e) updating said frequency error estimate from said unknown frequency offset value; and
        f) updating said phase error estimate from said unknown phase offset value.

2. The frequency and phase synchronizer system of claim 1 wherein said operations b through f are repeated an integral number of times.

3. The frequency and phase synchronizer system of claim 1 further including a digital receiver for generating a frequency and phase corrected output signal in response to said digital receiver receiving said updated estimated frequency error estimate and said updated estimated phase error estimate.

4. The frequency and phase synchronizer system of claim 1 wherein said unknown frequency offset value is determined by:
    generating a first product by multiplying said first sequence of even numbered samples by a first parameter;
    generating a first complex exponential value by applying a first discrete time voltage controlled oscillator to said frequency error estimate;
    generating a second product by multiplying said first product and said first complex exponential value;
    generating a second product by multiplying said second sequence of odd numbered samples by a second parameter;
    generating a second complex exponential value by applying a second discrete time voltage controlled oscillator to said frequency error estimate;
    generating a fourth product by multiplying said third product and said second complex exponential value;
    generating a sequence of first sum signals $SUM1_l$ by adding said second and fourth products, where l is an index and $1 \leq l \leq N$ and N is a positive integer;
    generating a first accumulated sum ASUM1, where $$ASUM1 = \sum_{1}^{N} SUM1_l;$$

generating a fifth product by multiplying said first accumulated sum ASUM1 by a third parameter;
    generating a third complex exponential value in response to receiving said phase error estimate;
    generating a sixth product having real and imaginary components by multiplying said third complex exponential value by said fifth product value; and
    equating said unknown frequency offset value to said imaginary component of said sixth product to update said unknown frequency offset value.

5. The frequency and phase synchronizer system of claim 1 wherein said unknown phase value is determined by:
    generating a seventh product by multiplying said first sequence of even numbered samples by a fourth parameter;
    generating a fourth complex exponential value by applying a third discrete time voltage controlled oscillator to said frequency error estimate;

generating an eighth product by multiplying said seventh product and said fourth complex exponential value;

generating a ninth product by multiplying said second sequence of odd numbered samples by a fifth parameter;

generating a fifth complex exponential value by applying a fourth discrete time voltage controlled oscillator to said frequency error estimate;

generating a tenth product by multiplying said ninth product and said fifth complex exponential value;

generating a sequence of second signals $SUM2_l$ by adding said eighth and tenth products, where l is an index and $1 \leq l \leq N$ and N is a positive integer;

generating a second accumulated sum ASUM2, where $$ASUM2 = \sum_{1}^{N} SUM2_l;$$

generating an eleventh product by multiplying said second accumulated sum ASUM2 by a sixth parameter;

adding said first discrete data sample to said eleventh product to obtain a third sum value;

generating a sixth complex exponential value in response to receiving said phase error estimate;

generating a twelfth product having real and imaginary components by multiplying said sixth complex exponential value by said third sum value; and equating said unknown phase offset value to said imaginary component of said twelfth product to update said unknown phase offset value.

6. The frequency and phase synchronizer system of claim 1 wherein said step of updating said frequency error estimate uses a time delayed frequency error estimate and a first step-size parameter.

7. The frequency and phase synchronizer system of claim 1 wherein said step of updating said phase error estimate uses a time delayed frequency error estimate and a second step-size parameter.

8. A method for providing frequency and phase synchronization of a continuous phase modulation signal, comprising the steps of:

a) initializing a frequency error estimate value and phase error estimate value;

b) separating discrete samples of a continuous phase modulation signal into a first sequence of odd numbered samples of said signal, and a second sequence of even numbered samples of said signal;

c) determining an unknown frequency offset value from said first and second sequences, frequency error estimate, and phase error estimate;

d) determining an unknown phase offset value from said first and second sequences, frequency error estimate, phase error estimate, and a first discrete data sample of said discrete samples of said continuous phase modulation signal;

e) updating said frequency error estimate from said unknown frequency offset value; and f) updating said phase error estimate from said unknown phase offset value.

9. The method of claim 8 wherein said unknown frequency offset value is determined by:

generating a first product by multiplying said first sequence of even numbered samples by a first parameter;

generating a first complex exponential value by applying a first discrete time voltage controlled oscillator to said frequency error estimate;

generating a second product by multiplying said first product and said first complex exponential value;

generating a third product by multiplying said second sequence of odd numbered samples by a second parameter;

generating a second complex exponential value by applying a second discrete time voltage controlled oscillator to said frequency error estimate;

generating a fourth product by multiplying said third product and said second complex exponential value;

generating a sequence of first sum signals $SUM1_l$ by adding said second and fourth products, where l is an index and $1 \leq l \leq N$ and N is a positive integer;

generating a first accumulated sum ASUM1, where $$ASUM1 = \sum_{1}^{N} SUM1_l;$$

generating a fifth product by multiplying said first accumulated sum ASUM1 by a third parameter;

generating a third complex exponential value in response to receiving said phase error estimate;

generating a sixth product having real and imaginary components by multiplying said third complex exponential value by said fifth product value; and equating said unknown frequency offset value to said imaginary component of said sixth product to update said unknown frequency offset value.

10. The method of claim 8 wherein said unknown phase value is determined by:

generating a seventh product by multiplying said first sequence of even numbered samples by a fourth parameter;

generating a fourth complex exponential value by applying a third discrete time voltage controlled oscillator to said frequency error estimate;

generating an eighth product by multiplying said seventh product and said fourth complex exponential value;

generating a ninth product by multiplying said second sequence of odd numbered samples by a fifth parameter;

generating a fifth complex exponential value by applying a fourth discrete time voltage controlled oscillator to said frequency error estimate;

generating a tenth product by multiplying said ninth product and said fifth complex exponential value;

generating a sequence of second signals $SUM2_l$ by adding said eighth and tenth products, where l is an index and $1 \leq l \leq N$ and N is a positive integer;

generating a second accumulated sum ASUM2, where $$ASUM2 = \sum_{1}^{N} SUM2_l;$$

generating an eleventh product by multiplying said second accumulated sum ASUM2 by a sixth parameter;

adding said first discrete data sample to said eleventh product to obtain a third sum value;

generating a sixth complex exponential value in response to receiving said phase error estimate;

generating a twelfth product having real and imaginary components by multiplying said sixth complex exponential value by said third sum value; and equating said unknown phase offset value to said imaginary component of said twelfth product to update said unknown phase offset value.

11. The method of claim 8 wherein said step of updating said frequency error estimate uses a time delayed frequency error estimate and a first step-size parameter.

12. The method of claim 8 wherein said step of updating said phase error estimate uses a time delayed frequency error estimate and a second step-size parameter.

13. A computer program product, comprising:
a computer usable medium having a computer readable program code embedded therein for causing a computer to execute a sequence of operations which include:
 a) initializing a frequency error estimate value and phase error estimate value;
 b) separating discrete samples of a continuous phase modulation signal into a first sequence of odd numbered samples of said signal, and a second sequence of even numbered samples of said signal;
 c) determining an unknown frequency offset value from said first and second sequences, frequency error estimate, and phase error estimate;
 d) determining an unknown phase offset value from said first and second sequences, frequency error estimate, phase error estimate, and a first discrete data sample of said discrete samples of said continuous phase modulation signal;
 e) updating said frequency error estimate from said unknown frequency offset value; and
 f) updating said phase error estimate from said unknown phase offset value.

14. The method of claim 13 wherein said sequence of operations for determining said unknown frequency offset value include:

generating a first product by multiplying said first sequence of even numbered samples by a first parameter;

generating a first complex exponential value by applying a first discrete time voltage controlled oscillator to said frequency error estimate;

generating a second product by multiplying said first product and said first complex exponential value;

generating a third product by multiplying said second sequence of odd numbered samples by a second parameter;

generating a second complex exponential value by applying a second discrete time voltage controlled oscillator to said frequency error estimate;

generating a fourth product by multiplying said third product and said second complex exponential value;

generating a sequence of first sum signals $SUM1_l$ by adding said second and fourth products, where l is an index and $1 \leq l \leq N$ and N is a positive integer;

generating a first accumulated sum ASUM1, where $$ASUM1 = \sum_{1}^{N} SUM1_l;$$

generating a fifth product by multiplying said first accumulated sum ASUM1 by a third parameter;

generating a third complex exponential value in response to receiving said phase error estimate;

generating a sixth product having real and imaginary components by multiplying said third complex exponential value by said fifth product value; and equating said unknown frequency offset value to said imaginary component of said sixth product to update said unknown frequency offset value.

15. The method of claim 13 wherein said sequence of operations for determining said unknown phase value include:

generating a seventh product by multiplying said first sequence of even numbered samples by a fourth parameter;

generating a fourth complex exponential value by applying a third discrete time voltage controlled oscillator to said frequency error estimate;

generating an eighth product by multiplying said seventh product and said fourth complex exponential value;

generating a ninth product by multiplying said second sequence of odd numbered samples by a fifth parameter;

generating a fifth complex exponential value by applying a fourth discrete time voltage controlled oscillator to said frequency error estimate;

generating a tenth product by multiplying said ninth product and said fifth complex exponential value;

generating a sequence of second signals $SUM2_l$ by adding said eighth and tenth products, where l is an index and $1 \leq l \leq N$ and N is a positive integer;

generating a second accumulated sum ASUM2, where $$ASUM2 = \sum_{1}^{N} SUM2_l;$$

generating an eleventh product by multiplying said second accumulated sum ASUM2 by a sixth parameter;

adding said first discrete data sample to said eleventh product to obtain a third sum value;

generating a sixth complex exponential value in response to receiving said phase error estimate;

generating a twelfth product having real and imaginary components by multiplying said sixth complex exponential value by said third sum value; and equating said unknown phase offset value to said imaginary component of said twelfth product to update said unknown phase offset value.

16. The method of claim 13 wherein said sequence of operations for updating said frequency error estimate uses a time delayed frequency error estimate and a first step-size parameter.

17. The method of claim 13 wherein said sequence of operations for updating said phase error estimate uses a time delayed frequency error estimate and a second step-size parameter.

* * * * *